(12) United States Patent
Hopfner et al.

(10) Patent No.: US 10,093,052 B2
(45) Date of Patent: Oct. 9, 2018

(54) MOLDED PRODUCT INCORPORATING A LABEL, AND RAZOR HANDLE COMPRISING SUCH A MOLDED PRODUCT

(75) Inventors: Guillaume Hopfner, Elsenheim (FR); Athanasios Karagiannis, Peristeri (GR)

(73) Assignee: BIC VIOLEX S.A., Anixi (GR)

( * ) Notice: Subject to any disclaimer, the term of this patent is extended or adjusted under 35 U.S.C. 154(b) by 217 days.

(21) Appl. No.: 13/319,898

(22) PCT Filed: May 27, 2009

(86) PCT No.: PCT/EP2009/056464
§ 371 (c)(1),
(2), (4) Date: Jan. 25, 2012

(87) PCT Pub. No.: WO2010/136065
PCT Pub. Date: Dec. 2, 2010

(65) Prior Publication Data
US 2012/0124846 A1     May 24, 2012

(51) Int. Cl.
| B29C 45/16 | (2006.01) |
| B26B 21/52 | (2006.01) |
| B29C 45/14 | (2006.01) |
| B29L 31/00 | (2006.01) |

(52) U.S. Cl.
CPC ........ B29C 45/1671 (2013.01); B26B 21/522 (2013.01); B26B 21/528 (2013.01); *B29C 45/14336* (2013.01); *B29C 45/1676* (2013.01); *B29C 2045/14918* (2013.01); *B29L 2031/7186* (2013.01); *Y10T 428/24752* (2015.01)

(58) Field of Classification Search
CPC .......... B29C 2045/14901; B29C 2045/14909; B29C 45/1671; B29C 21/528; B29C 21/522; B29L 2031/7186; Y10T 428/24752; B26B 21/528; B26B 21/522
USPC .............. 264/250–252, 254–255; 206/459.5, 206/775–776, 490; 220/680–681; 30/526, 34.05–40.2; 156/936, 383; 40/6, 40/781, 314, 334, 360, 628–631; 428/57; 16/432–436
See application file for complete search history.

(56) References Cited

U.S. PATENT DOCUMENTS

| 2,067,526 | A | * | 1/1937 | Graham ......................... 40/314 |
| 2,489,707 | A | * | 11/1949 | Eubanks ....................... 206/361 |
| 4,680,882 | A | * | 7/1987 | Watson, Jr. ........................ 40/5 |
| 5,157,835 | A | * | 10/1992 | Lazarchik et al. .............. 30/533 |

(Continued)

FOREIGN PATENT DOCUMENTS

| DE | 10 2005 035 899 A1 | 2/2007 |
| EP | 1 710 069 A2 | 10/2006 |

(Continued)

OTHER PUBLICATIONS

Patent Cooperation Treaty—International Search Report for PCT/EP2009/056464.

*Primary Examiner* — Sean Michalski
*Assistant Examiner* — Fernando Ayala
(74) *Attorney, Agent, or Firm* — Polsinelli PC (57) ABSTRACT

A molded product that includes a first molded part, a second molded part, and a label having a rear side provided on the first molded part, a front side opposite to the rear side, the front side having a peripheral border. The second molded part has an overlapping portion which overlaps the front side of the label only on the peripheral border.

6 Claims, 8 Drawing Sheets

(56) References Cited

U.S. PATENT DOCUMENTS

| | | | | |
|---|---|---|---|---|
| 5,497,551 | A * | 3/1996 | Apprille, Jr. | 30/526 |
| 5,630,244 | A * | 5/1997 | Chang | 15/167.1 |
| 6,370,783 | B1 * | 4/2002 | Bozikis et al. | 30/526 |
| 6,588,113 | B2 * | 7/2003 | Bozikis et al. | 30/526 |
| 6,792,710 | B2 * | 9/2004 | Whitlow et al. | 40/768 |
| 7,415,788 | B2 * | 8/2008 | Little et al. | 40/314 |
| 8,161,591 | B2 * | 4/2012 | Gatzemeyer et al. | 15/143.1 |
| 8,302,233 | B2 * | 11/2012 | Spanks et al. | 12/142 F |
| 8,448,285 | B2 * | 5/2013 | Kayser | 15/167.1 |
| 8,495,830 | B2 * | 7/2013 | Price | 40/711 |
| 8,549,691 | B2 * | 10/2013 | Moskovich et al. | 15/143.1 |
| 2002/0059733 | A1 * | 5/2002 | Bozikis et al. | 30/526 |
| 2002/0088111 | A1 * | 7/2002 | Von Arx | A47G 19/2288 29/611 |
| 2002/0104182 | A1 * | 8/2002 | Panfili et al. | 15/236.01 |
| 2004/0018337 | A1 | 1/2004 | Hus et al. | |
| 2004/0209032 | A1 * | 10/2004 | Wani et al. | 428/57 |
| 2004/0244204 | A1 * | 12/2004 | Elsener-Zehnder et al. | 30/151 |
| 2007/0186453 | A1 * | 8/2007 | Little et al. | 40/314 |
| 2008/0000127 | A1 * | 1/2008 | Shimer | 40/768 |
| 2008/0110774 | A1 * | 5/2008 | Chisholm et al. | 206/216 |
| 2009/0179342 | A1 * | 7/2009 | Araujo et al. | 264/161 |
| 2009/0193603 | A1 * | 8/2009 | Ponzini | 15/167.1 |
| 2013/0061481 | A1 * | 3/2013 | Cooney | 30/526 |

FOREIGN PATENT DOCUMENTS

| | | |
|---|---|---|
| WO | WO 01/96088 A1 | 12/2001 |
| WO | WO 2004/011224 A1 | 2/2004 |

* cited by examiner

MOLDED PRODUCT INCORPORATING A LABEL, AND RAZOR HANDLE COMPRISING SUCH A MOLDED PRODUCT

CROSS REFERENCE TO RELATED APPLICATION

This application is a national stage application of International Application No. PCT/EP2009/056464, filed on May 27, 2009, the entire contents of this application are incorporated herein by reference.

FIELD OF THE INVENTION

The embodiments of the present invention relate to a molded product that incorporates an informative or decorative label, and to a razor handle that includes such a molded product.

More precisely, the embodiments of the present invention are directed to a molded product includes:
a first molded part,
a second molded part, and
a label, having a rear side provided on the first molded part, and a front side opposite to the rear side, the front side having a peripheral border.

BACKGROUND OF THE INVENTION

Patent application US2007194489 discloses a molded product having a first molded part, a second molded part, and having one or two incorporated labels, one label being fully overlapped by the second molded part which is translucent, and the second label being located on the outside face of the first molded part and not covered at all by the second molded part. This document fails to disclose a label protected against delamination, and in particular regarding the border of the label.

OBJECT AND SUMMARY OF THE INVENTION

One purpose of the embodiments of the present invention is to improve the protection of the label and specially its borders, in particular to prevent delamination.

To this end, the molded product according to the embodiments of the present invention is characterized in that the second molded part has an overlapping portion which overlaps the front side of the label only on said peripheral border.

In various embodiments of the present invention, one and/or the other of the following features may be incorporated:
the overlapping portion has an overlapping surface comprised between 0.3% and 3% the front side surface.
the overlapping portion has a thickness which is less than 1 mm,
the first molded part comprises a rigid material and the second molded part includes an elastomeric material.

The embodiments of the present invention also concern a razor handle that includes a molded product according to the above features.

The embodiments of the present invention also concern a razor that includes a razor handle according to the above features, and a razor head that includes at least one blade and attached to the razor handle.

The embodiments of the present invention further concerns a method for manufacturing a molded product, the method includes the steps of:

a—providing a label having a rear side, a front side, the front side having a peripheral border,
b—providing a first mould cavity,
c—placing the label in the first mould cavity, the front side of the label being placed against the wall of the first mould cavity,
d—injecting a first plastic material in the first mould cavity to form an intermediate part comprising the label,
e—after curing, ejecting the intermediate part,
f—providing a second mould cavity,
g—placing the intermediate part in the second mould cavity, the front side of the label being placed against the wall of the second mould cavity,
h—injecting a second plastic material in the second mould cavity, such that after curing the second plastic material overlaps the front side of the label on the peripheral border,
i—after curing, ejecting the molded product obtained therefrom.

In various embodiments of the method according to the present invention, one and/or the other of the following features may be incorporated:
the first and second mould cavities belongs to a single mould, and the steps of injecting the first plastic material and injecting the second plastic are simultaneously performed to manufacture simultaneously an intermediate part and a molded product.
the second plastic material is injected through openings provided in the first plastic material of the intermediate part.

The above and other objects and advantages of the present invention will become apparent from the detailed description of an embodiment of the present invention, considered in conjunction with the accompanying drawings.

In the various figures, the same references designate elements which are identical or similar.

DETAILED DESCRIPTION

Figure 1A:
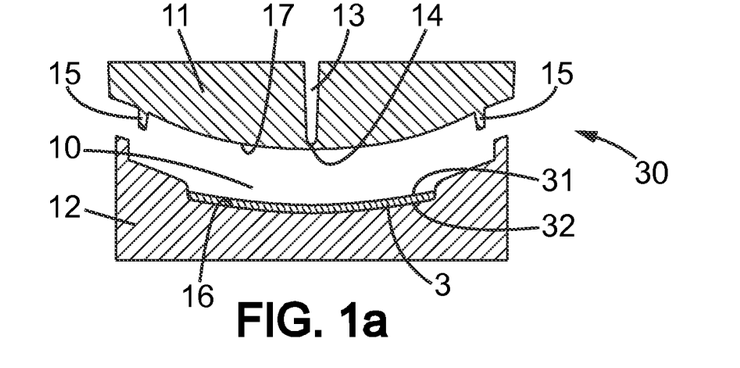
FIG. 1a shows a first mould unit used in a first step of a method according to the invention, shown in an open state.

FIG. 1a shows a first mould unit 30 comprising a first half-mould 11, a second half-mould 12, and a mould cavity 10 (named hereafter a 'first mould cavity' 10), shown in an open state. The first half-mould 11 comprises a sprue channel 13 for injecting into the first mould cavity 10 a melted material the sprue channel leading to the first cavity 10 via a sprue opening 14 located in the mould wall 17 of the first half-mould 11. In the example depicted here, there is only one sprue channel close to the middle of the first half-mould 11, but variants with a sprue channel in a different position or with several sprue channels can be designed without departing from the scope of the invention.

A label 3 is introduced in the first mould cavity 10. This label 3 is preferably a thin plastic foil having a surface and a substantially constant thickness in the illustrated example. This label 3 has a rear side 31, which comprises a superficial layer preferably made of an ABS based material, and a front side 32 and preferably carries, at least visible from the front side 32, information or decorative pattern or any other marking. When the first mould unit 30 is opened, this label 3 is placed against the mould wall 16 of the second half-mould 12 of the first mould unit 30 prior to closing, in such a way that the front side 32 of the label bears against the mould wall 16 of the second half-mould 12. The label can be held in position by gravity, by electrostatic means, or by other means not depicted though known in the art. In particular, if the label is provided with one or more slots, one or more corresponding protrusions provided in the wall 16 of the second half-mould 12 can advantageously maintain the label in position.

The first half-mould 11 further comprises projections 15 which protrude from the mould wall 17 of the first half-mould 11, in direction of the second half-mould 12.

After having placed the label against the mould wall 16 of the second half-mould 12, the first mould unit 30 is closed by moving the first and second half-moulds 11,12 towards one another.

Figure 1B:
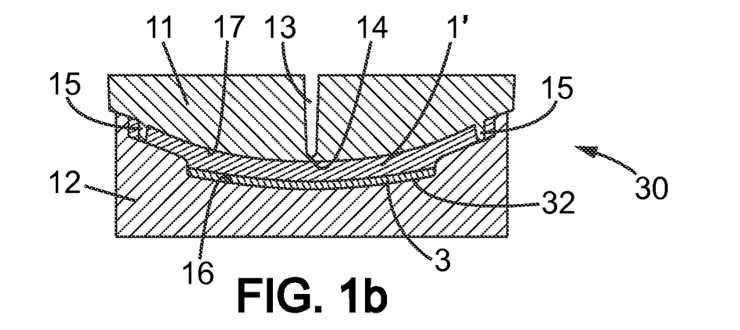
FIG. 1b shows the first mould unit after injection.

FIG. 1b shows the first mould unit 30 after closing and injection.

A first melted material 1' is injected through the sprue channel 13 and the opening 14 into the first mould cavity 10, in the closed state. This first melted material 1' can be an ABS based resin and is fluid enough to spread in all the volume of the first cavity 10, so to completely fill the first cavity 10. The first melted material 1' extends on the rear side 31 of the label. Due to the chemical compatibility between the ABS based resin and the composition of the ABS based superficial layer of the rear side 31 of the label, the first melted material 1' can mix with at least a part of the superficial layer of the rear side 31 of the label 3 in order to create chemical bonds. The intermediate layers of the label 3 and its front side 32 are not altered by the molding operation.

As illustrated in FIG. 1b, when the first mould unit 30 is closed, the projections 15 extending from the first half-mould 11, touch the wall of the second half-mould 12, therefore providing volumes which are not filled by the injected material.

Figure 1C:
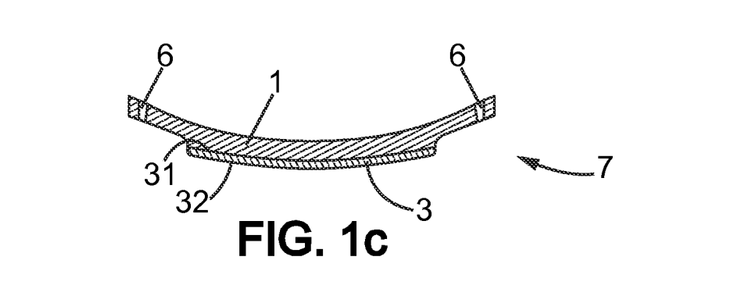
FIG. 1c shows an intermediate product obtained by the first step of the method involving the first mould unit.

FIG. 1c shows an intermediate product 7 obtained after curing and being ejected from the first mould cavity 10. The first melted material and the label 3 become after solidifying the intermediate product 7. During solidifying, the first melted material 1' becomes a first molded part 1 comprising openings 6 which results from the volume above mentioned.

Figure 2A:
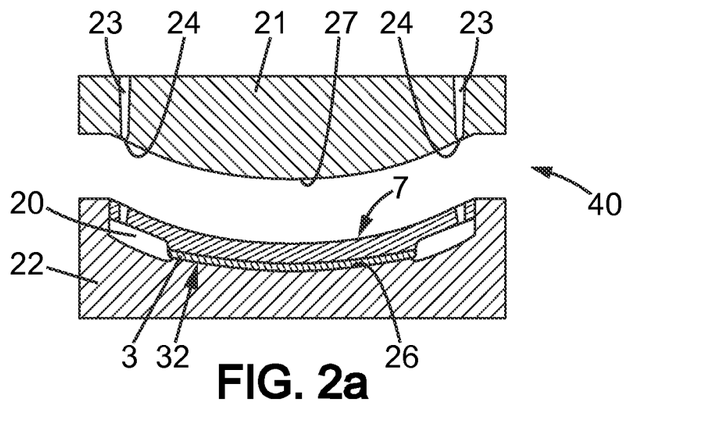
FIG. 2a shows a second mould unit used in a second step of the method according to an embodiment of the invention, shown in an open state.

FIG. 2a shows a second mould unit 40, comprising a first half-mould 21, a second half-mould 22, and a mould cavity 20 (named hereafter a 'second mould cavity' 20), shown in an open state. The first half-mould 21 comprises two sprue channels 23 for injecting a melted material into the cavity, the sprue channels 23 ending in the second cavity 20 through openings 24 located in the mould wall 27 of the first half-mould 21. In the example depicted here, there are two sprue channels 23 on the peripheral area of the first half-mould 21, but variants with different positions or with more sprue channels or with only a single sprue channel can be designed without departing from the scope of the invention.

The intermediate product 7 obtained from the first molding step is inserted into the second mould cavity 20 and placed against the second half-mould 22, with the front side 32 of the label 3 placed against the wall 26 of the second half-mould 22.

Figure 2B:
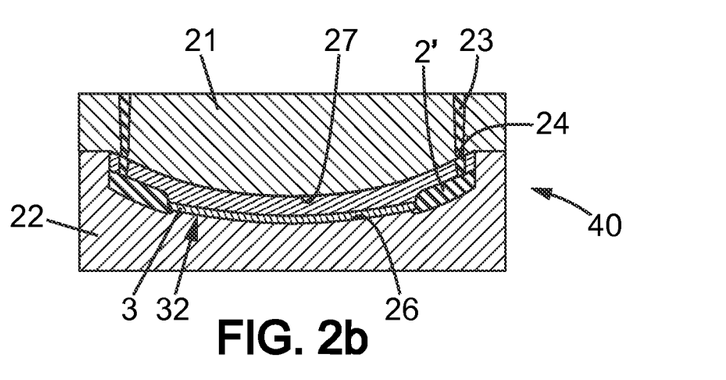
FIG. 2b shows the second mould unit after injection.

FIG. 2b shows the second mould unit 40 after closing and injection.

When the second mould unit 40 is closed, the second cavity 20 is delimited by the wall 27 of the first half-mould 21 and the wall 26 of the second half-mould 22. This second cavity 20 is larger than the first cavity 10, and is designed to be able to receive and enclose an intermediate product 7. The remaining volumes non occupied by the intermediate product 7 is ready to receive the injection of a second melted material 2'.

The second melted material 2' is injected through the sprue channels 23 and the openings 24 into the closed cavity 20. This second melted material 2' is preferably an elastomeric resin which is at a fluid state. The second melted material 2', also called 'elastomeric melted material 2', enters the empty volumes of the second cavity 20 through the openings 6 of the intermediate part 7 to completely fill them.

After injection, the second melted material 2' extends against the wall 27 of the second half-mould 22, and extends partially on the front side 32 of the label, on a peripheral border 33 of this front side 32 as it will be explained in details later.

Figure 2C:
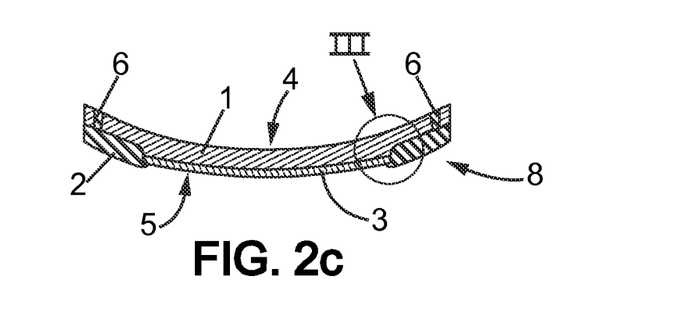
FIG. 2c shows a molded product obtained by the second step of a method involving the second mould unit.

FIG. 2c shows a molded product 8 obtained during the second step of the method involving the second mould cavity 20. The elastomeric melted material 2' becomes after solidifying a second molded part 2, which firmly adheres to the first molded part 1.

The adherence between the first molded part 1 and the second molded part 2 may be both chemical and mechanical, where the openings 6, being filled with the second melted material 2', become anchoring areas.

The second molded part 2 overlaps the label 3 on the peripheral border 33 of the front side 32 of the label 3.

The molded product 8 comprises the first molded part 1, the second molded part 2, and the label 3.

This molded product 8 may have, according to the shape of the first and second mould cavities 10, 20, any desired form. It can be substantially flat, but it can also have a curvature like in the example depicted in the figures, where the inner face 4 has a concave shape and the opposed outer face 5 has a convex shape.

Figure 3:
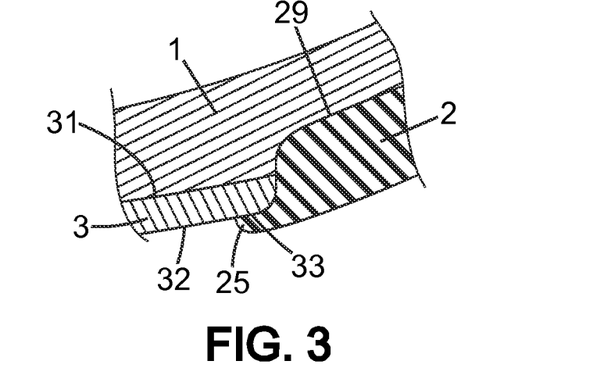
FIG. 3 is a detailed section of the molded product, showing an overlapping area.

FIG. 3 is a detailed section of the molded product 8. The rear side 31 of the label 3 bears on the first molded part 1. The front side 32 of the label 3 comprises the peripheral border 33.

The second molded part 2 has a interface surface 29 with the first molded part 1 comprises an overlapping portion 25 which overlaps the front side 32 of the label only on the peripheral border 33, the rest of the front side 32 being covered with no molded part and therefore exposed to the environment.

Figure 4A:
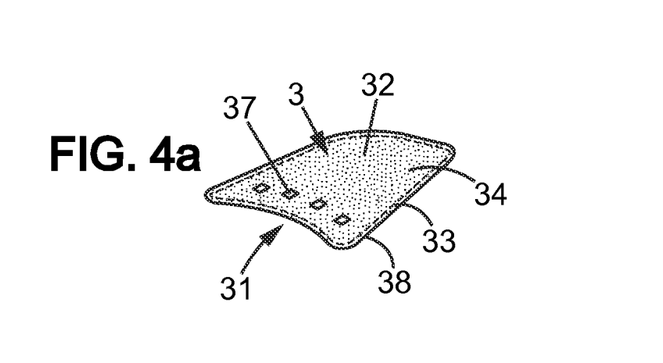
FIG. 4a shows a label used in the method illustrated in FIGS. 1a-3.

FIG. 4a shows the label 3, prior to insertion in the first mould unit 30, seen from the front side 32. The peripheral border 33 extends along the complete contour 38 of the front side 32. In the example, the contour 38 is a rounded rectangle substantially flat, but the contour 38 might have one or several edges. The peripheral border 33 extends from the external edge of the border on a certain width, which is preferably comprised between 0.5 mm and 3 mm.

In case the complete molded product 8 to be obtained has a significant curvature, the label 3 may undergo a preforming step prior to insertion in the mould. The label 3, being two dimensional (substantially flat), is therefore shaped in 3-dimensions with help of preforming means.

Figure 4B:
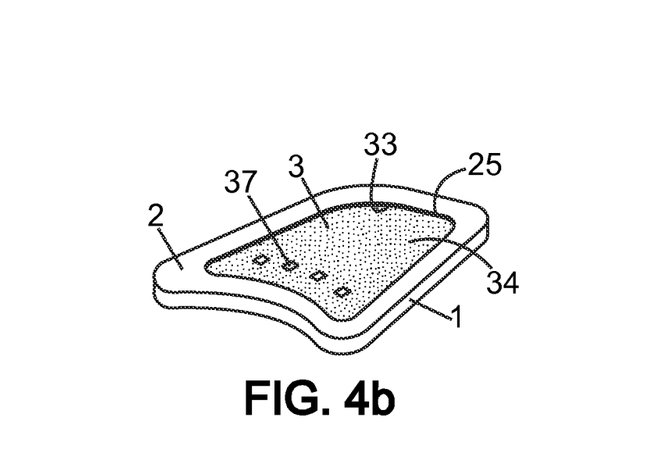
FIG. 4b shows a molded product obtained by a method illustrated in FIGS. 1a-3.

FIG. 4b shows the complete molded product 8 obtained by the method illustrated in FIGS. 1a to 2c. The molded product 8 comprises the first molded part 1 which is for example a rigid plastic material, the second molded part 2 which is for example an elastomeric material, and the label 3. The peripheral border 33 of the front side 32 is covered by the overlapping portion 25 of the elastomeric material 2, whereas the remaining part 34 of the front side 32 of the label 3 is exposed on the outer face and exposed to the external environment. The front side 32 of the label 3 may carry any type of information of marking, and as most of the surface of the label is not covered, the information and marking can appear brightly and without deformation.

Preferably, the front side 32 of the label 3 has a front side surface, and the overlapping portion 25 has an overlapping surface comprised between 0.3% and 3% of the front side surface.

Preferably, in the example shown the overlapping portion 25 of the elastomeric material 2 has a thickness which is less than 1 mm. The step between the overlapping portion 25 and the front side 32 of the label 3 not covered by the elastomeric material is, as a result, very small and provides a generally even surface.

When the molded product 8 is used by a user or during handling, the elastomeric material 2 may be inadvertently mechanically stressed, but thanks to its resilient properties, it comes back to its initial position when the stress stops. Therefore, the protection of the peripheral border 33 of the front side 32 of the label is ensured over time, and the molded product 8 is protected against aging, especially delamination, and is provided with an enlarged lifetime.

According to another aspect of the invention, the molding process involving the first and second mould units 30,40 can be optimized by combining the first and second molding steps in a single operation as it will be explained hereafter.

Figure 5A:
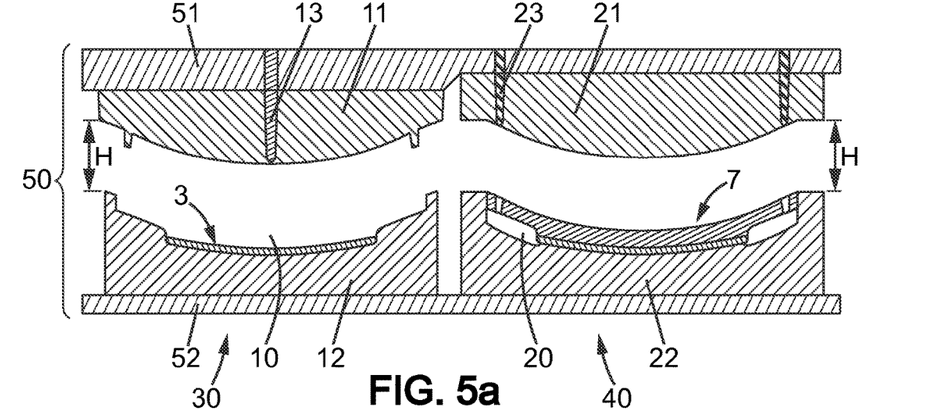
FIG. 5a-5b show a mould comprising a first cavity and a second cavity, used in the method according to an embodiment of the invention.

FIG. 5a shows a mould assembly 50 comprising a first mould unit 30 which comprises the first cavity 10 and a second mould unit 40 which comprises the second cavity 20. The first half-mold 11 of the first mould unit 30 and the first half-mold 21 of the second mould unit 40 are rigidly linked by a first support 51, whereas the second half-mold 12 of the first mould unit 30 and the second half-mold 22 of the second mould unit 40 are rigidly linked by a second support 52, in such a way that the first half-mold 11 is precisely in front of the second half-mold 12 spaced at a certain distance H, and the first half-mold 21 is precisely in front of the second half-mold 22 at the same distance.

The mould assembly 50 is illustrated in an open state, with a label 3 placed on the first cavity 10 and an intermediate part 7 placed in the second cavity 20.

Figure 5B:
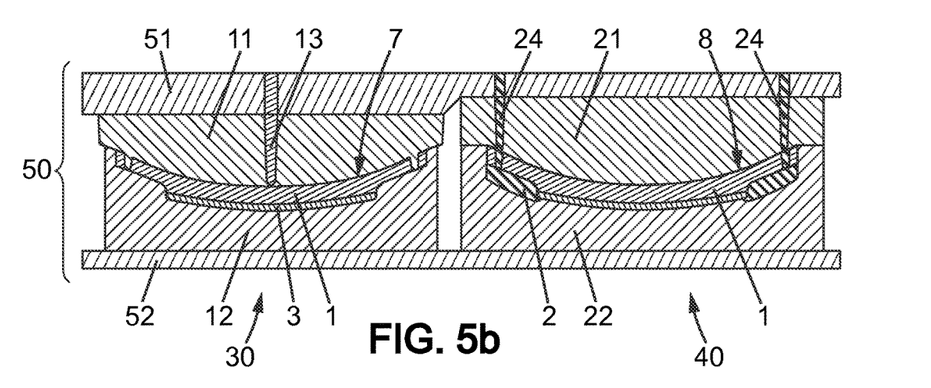

FIG. 5b shows the mould assembly 50 in the closed state (where the distance H is substantially equal to zero) during the injection step.

Advantageously, the mould assembly 50 is used to manufacture at the same time an intermediate part 7 and a molded product 8, thanks to the succession of the following steps:
- when the mould is opened, a label 3 is placed in the first cavity 10 as described above, and intermediate part 7 is placed in the second cavity 20,
- the mould assembly 50 is closed,
- a first injection material is injected in the first cavity 10 and a second injection material 2' is injected in the second cavity 20 in the same manner as described above,
- after curing of the two injected materials 1',2', the mould assembly 50 is opened,
- an intermediate part 7 is ejected from first cavity 10 and a molded product 8 is ejected from the second cavity 20.

FIGS. 6 to 13 describe a razor 84 comprising a razor handle 82 which comprises a molded product as above disclosed and obtained with the method according to the invention.

Figure 6:
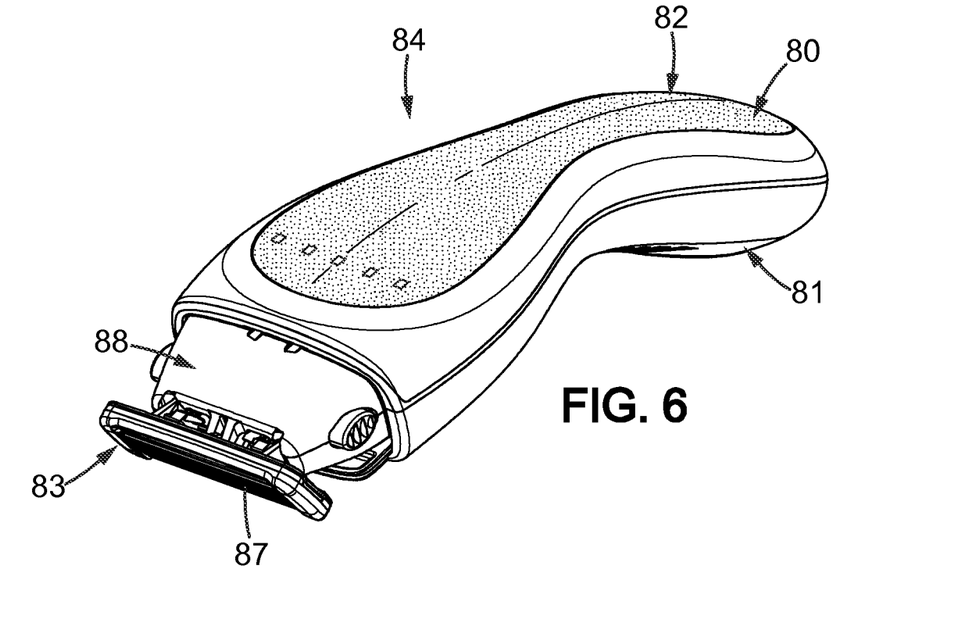
FIG. 6 shows a razor comprising a razor handle which comprises a molded product obtained by the method according to an embodiment of the invention.

FIG. 6 shows a wet razor 84 comprising a razor handle 82. The razor handle 82 comprises two body parts: a bottom body part 81 and a top body part 80. The top body part 80 is a molded product obtained according to a method similar to the method illustrated above in FIGS. 1a to 5, as explained below.

The razor further comprises a razor head carrier 88, a razor head 83 having one or more longitudinal blades 87, the razor head 83 being attached, preferably, pivotably, to the razor head carrier 88.

Figure 7:
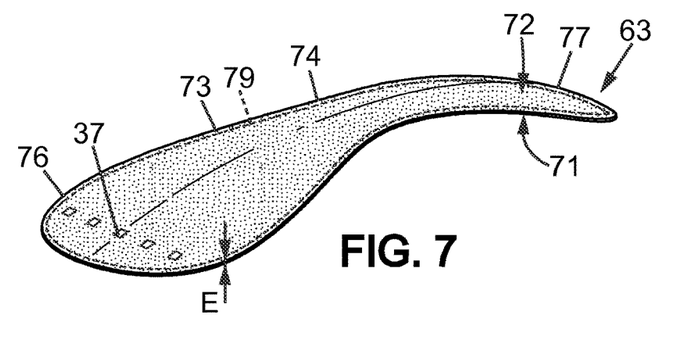
FIG. 7 shows a label used in the molded product obtained by the method according to an embodiment of the invention, for the razor shown in FIG. 6.

FIG. 7 shows a label 63 similar to the label 3 described above. This label 63 comprises a rear side 71 and a front side 72 which may bear a pattern, a logo, user instructions, or any other information or marking (37 in the figures). This label 63 is preferably aplastic foil and has a small and substantially constant thickness (E), which is preferably comprised between 0.1 mm and 0.5 mm.

Of course the label 63 may have an uneven thickness and may even comprise some tridimensional patterns.

The peripheral border 73 is extending along the complete contour of the label 63, with a substantially constant width. This peripheral border is delimited by a dotted line 79 spaced from the border, and the border itself.

This label 63 extend from a first end 77 having a round contour to a second end 76, having also a round contour, and in an intermediate portion 74 between the first and second ends 77, 76 the width of the label is smaller: this shape is designed to match the general shape of the top body part 80 of the razor handle 82 in order to provide a ergonomic shape to the razor handle 82.

Figure 8:
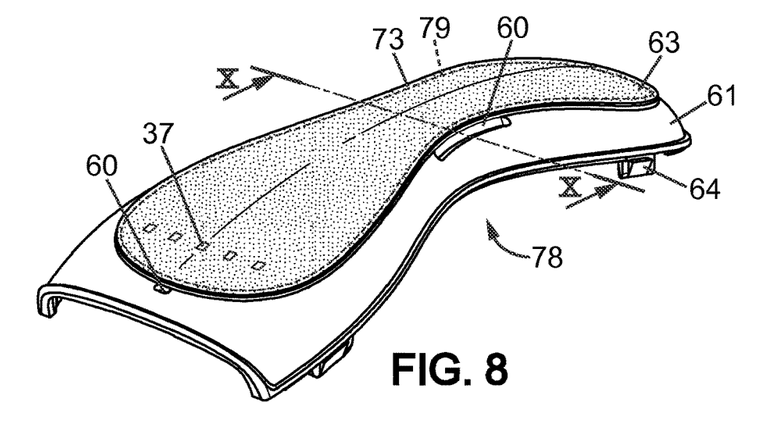
FIG. 8 shows an intermediate product obtained by the first step of the method according to an embodiment of the invention, for the razor shown in FIG. 6.

FIG. 8 shows an intermediate product 78 obtained by the first step of the method according to the invention. An injection plastic material is injected into a first mould cavity as it will be detailed below, which results after curing in a first molded part 61, which is preferably a rigid plastic part (for example ABS, polystyrene, or any member of the 'Styrenics' family).

In this first molded part 61 are provided three openings 60 which are similar to the openings 6 already described above, whose purpose is to let the way to a second injected material, which is preferably an elastomeric material, for example a styrene-butadiene rubber or a thermoplastic elastomer.

In this first molded part 61 are also provided clips 64 which enters in matching grooves provided in the bottom body part 81, for realizing a snap fitting assembly of the razor handle 82.

Figure 9:
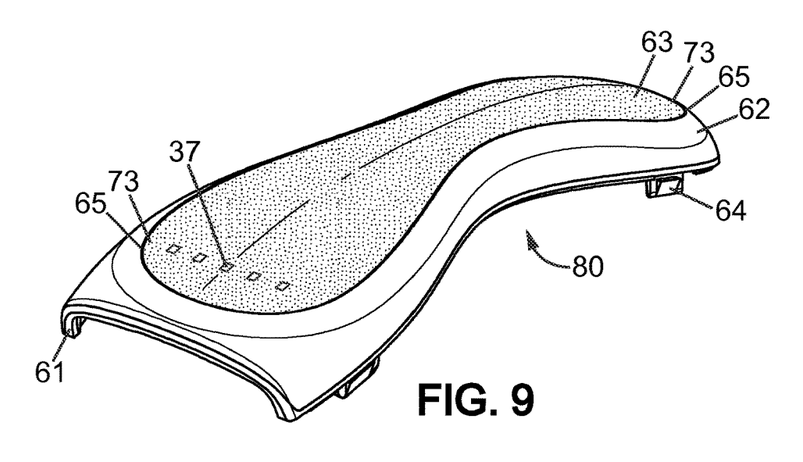
FIG. 9 shows a molded product obtained by the method according to an embodiment of the invention, for the razor shown in FIG. 6.

FIG. 9 shows the top body part 80 of the razor handle 82 obtained by the method according to the invention.

An injection plastic material is injected into a second mould cavity as it will be detailed below, which results after curing in a second molded part 62, which is an elastomeric molded part. The border 73 of the front side 72 of the label is covered by an overlapping portion 65 of the second molded part 62, in a manner similar to what was described in details about FIG. 3.

Figure 10:
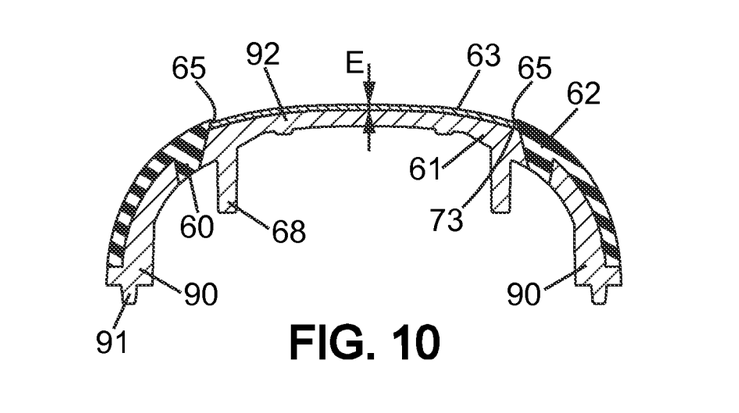
FIG. 10 shows a section of the molded product obtained by the method according to an embodiment of the invention, for the razor shown in FIG. 6.

FIG. 10 shows a section of the top body part 80, comprising the first molded part 61, the second molded part 62 and the label 63.

The first molded part 61, obtained after curing form the first injected material, comprises a center portion 92, lateral walls 90, guiding ribs 68, 91 and openings 60 filled with the second injected material.

The second molded part 62, obtained after curing form the second injected material has elastomeric properties and comprises an overlapping portion 65 which overlaps the peripheral border 73 of the label 63. This overlapping portion 65 has a thickness which is less than 1 mm, and preferably comprised between 0.5 mm and 1 mm.

Figure 11:
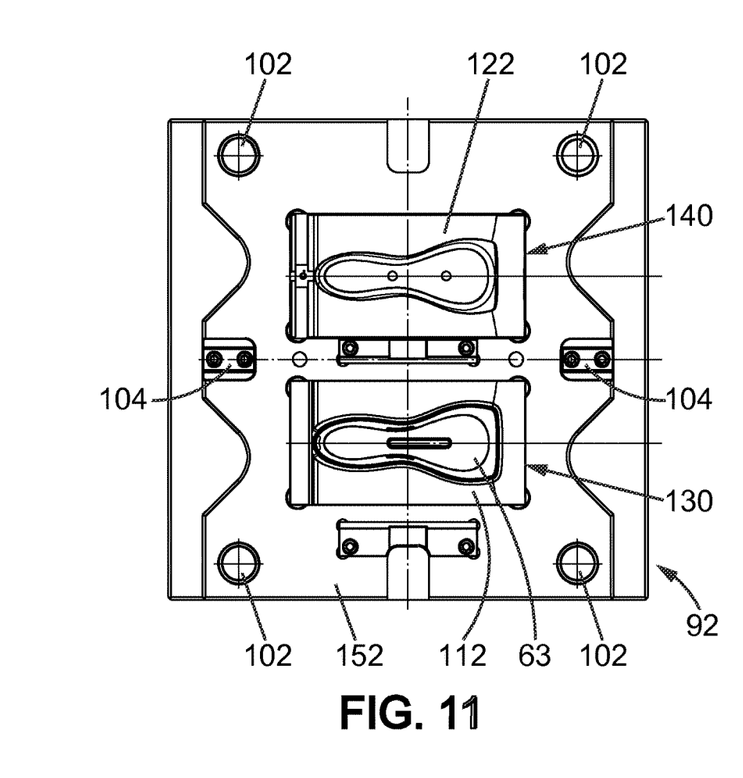
FIG. 11 shows a section of a mould used to manufacture the molded product of FIG. 9, taken along line XI-XI of FIG. 13.
Figure 12:
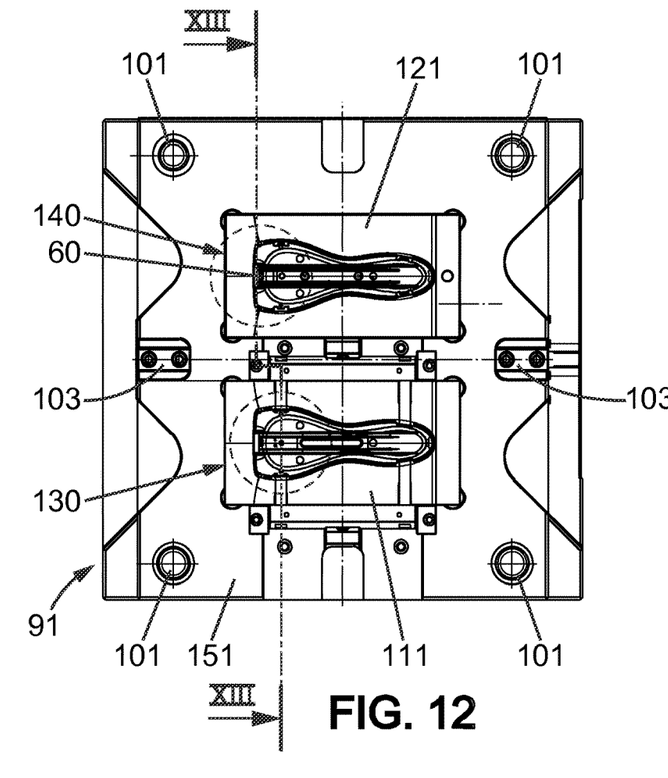
FIG. 12 shows another section of a mould used to manufacture the molded product of FIG. 9, taken along line XII-XII of FIG. 13.
Figure 13:
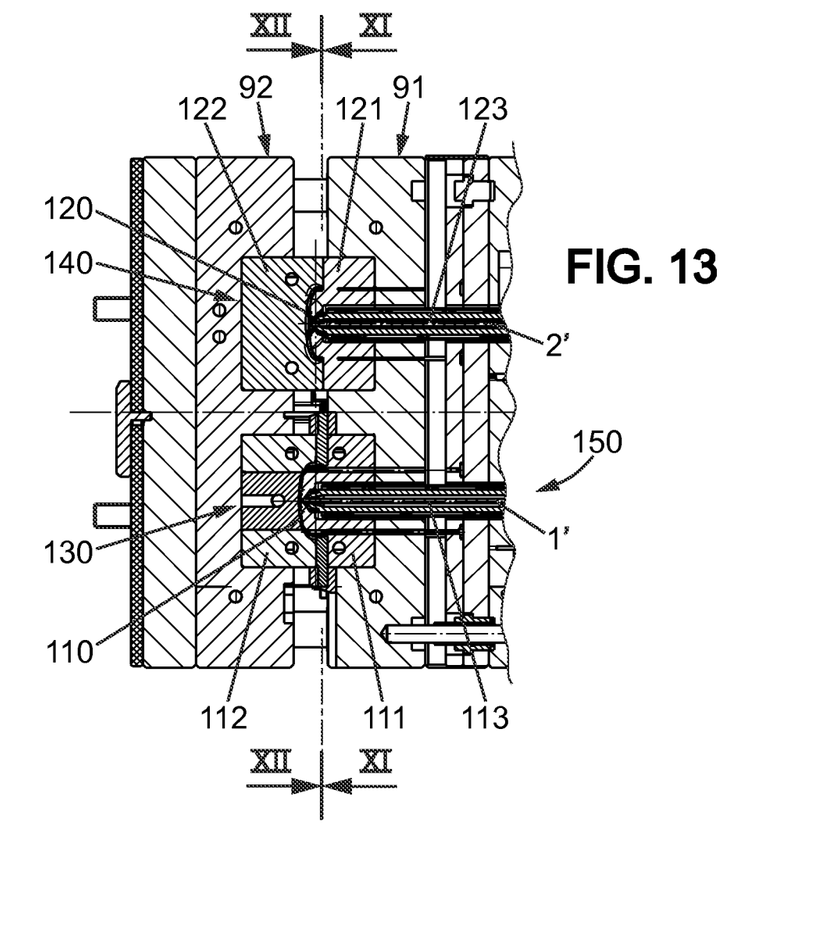
FIG. 13 shows another section of a mould used to manufacture the molded product of FIG. 9, taken along line XIII-XIII of FIG. 11.

FIGS. 11 to 13 describe a mould assembly 150 specifically designed to manufacture such a razor handle molded part, this mould assembly 150 comprising a first mould unit 130 and a second mould unit 140 similar to the first and mould units 30, 40 already described above, but specifically designed to manufacture a razor handle molded part.

FIG. 11 shows a part 92 of the mould assembly 150, also called 'female' part 92, comprising the second half-mould 112 of the first mould unit 130 and the second half-mould 122 of the second mould unit 140.

FIG. 12 shows another part 91 of the mould assembly 150, also called 'male' part 91, comprising the first half-mould 111 of the first mould unit 130 and the first half-mould 121 of the second mould unit 140.

The 'male' part 91 comprises guiding rods 101 and the 'female' part 92 comprises guiding recesses 102, slidably receiving the guiding rods 101. These guiding means allows a single movement of translation of one part relative to the other, as it is known in the art of mould techniques, and additional locatings 103,104 improve the accurate positioning of one part relative to the other when they are brought in contact with one another.

When the 'male' part 91 and the 'female' part 92 are brought into contact, defining:
a first cavity 110 defined by the first half-mould 111 and the second half-mould 112 of the first mould unit 130,
a second cavity 120 defined by the first half-mould 121 and the second half-mould 122 of the second mould unit 140.

Prior to injection, the label 63 is placed against the second half-mould 112 of the first mould unit 130, and an intermediate part 78 is placed against the second half-mould 122 of the second mould unit 140.

FIG. 13 shows a section of the mould assembly 150, taken along line XIII-XIII of FIG. 11, in the close state, during molding.

The 'male' part 91 and the 'female' part 92 are bearing against each other, enclosing the label 63 in the first cavity 110, and the intermediate part 78 in the second cavity 120.

The 'male' part 91 includes both the injection devices (sprue channels 113, 123) and the ejecting devices, whereas the 'female' part 92 is as simple as possible.

The first cavity 110 is fed by a first injection material 1' through a first sprue channel 113, and the second cavity 120 is fed by a second injection material 2' through a second sprue channel 123, in a manner similar to the first and second sprue channel 13,23 described above, thus not described in details again here.

The injections of the first injection material 1' and the second injection material 2' take place at the same time, thereby decreasing the process time compared to subsequent injections.

After curing, the mould assembly 150 is opened, an intermediate part 78 is ejected from the first cavity 110, and a molded product 80 is ejected from the second cavity 120.

Then, the method can be again applied: a new label 63 is placed against the second half-mould 112 of the first mould unit 130, and a new intermediate part 78 is placed against the second half-mould 122 of the second mould unit 140.

Since it is well known in the art, the thermal management features in the mold 150, and the handling of parts are not described here.

The invention claimed is:

1. A molded product comprising:
a first molded part,
a second molded part, and
a thin plastic foil label having a rear side provided on the first molded part, a front side opposite to the rear side, the front side being mostly exposed to an external environment, the front side having a peripheral border, and
wherein the second molded part has an overlapping portion which overlaps the front side of the label only on the peripheral border, and prevents delamination of the label,
wherein the overlapping portion has a thickness which is less than 1 mm, so that the overlapping portion and the front side of the label not covered by the second molded part together exhibits an even surface, and
wherein the first molded part includes openings forming anchoring areas for the second molded part, the second molded part molded into the openings of the first molded part, the opening being fully filled with material of the second molded part, the first molded part and the second molded part being both chemically and mechanically bonded in the anchoring areas.

2. The molded product according to claim 1, wherein the front side of the label has a front side surface, and wherein the overlapping portion has an overlapping surface comprising between 0.3% and 3% of the front side surface.

3. The molded product according to claim 1, the label has a substantially constant thickness wherein the thickness of the label is comprised between 0.1 mm and 0.5 mm.

4. The molded product according to claim 1, wherein the first molded part comprises a rigid material and wherein the second molded part comprises an elastomeric material.

5. A razor handle comprising a molded product according to claim 1.

6. A razor comprising:
a razor handle according to claim 5, and
a razor head which comprises at least one blade and which is attached to the razor handle.

* * * * *